(12) United States Patent
Tsuchiya et al.

(10) Patent No.: US 8,130,344 B2
(45) Date of Patent: Mar. 6, 2012

(54) LIQUID CRYSTAL DEVICE AND ELECTRONIC APPARATUS

(75) Inventors: Hitoshi Tsuchiya, Chino (JP); Tomo Ikebe, Suwa (JP); Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 238 days.

(21) Appl. No.: 12/511,570

(22) Filed: Jul. 29, 2009

(65) Prior Publication Data
US 2010/0066952 A1 Mar. 18, 2010

(30) Foreign Application Priority Data
Sep. 12, 2008 (JP) ................................. 2008-234379

(51) Int. Cl.
*G02F 1/1335* (2006.01)
*G02F 1/1343* (2006.01)
(52) U.S. Cl. ........................................ 349/107; 349/141
(58) Field of Classification Search .......... 349/106–108, 349/141, 143
See application file for complete search history.

(56) References Cited

U.S. PATENT DOCUMENTS

| | | | |
|---|---|---|---|
| 5,581,381 A | 12/1996 | Shinjo et al. | |
| 6,233,034 B1 | 5/2001 | Lee et al. | |
| 6,525,798 B1 | 2/2003 | Yamakita et al. | |
| 6,842,207 B2 * | 1/2005 | Nishida et al. | 349/107 |
| 2008/0062339 A1 | 3/2008 | Sekime | |

FOREIGN PATENT DOCUMENTS

| | | |
|---|---|---|
| JP | 11-202356 B2 | 7/1999 |
| JP | 2008-09-280 A | 4/2008 |
| KR | 20010040114 A | 5/2001 |
| KR | 20020091454 A | 12/2002 |
| KR | 20040081821 A | 9/2004 |

* cited by examiner

*Primary Examiner* — Dung T. Nguyen
(74) *Attorney, Agent, or Firm* — Lowe, Hauptman, Ham & Berner, LLP

(57) ABSTRACT

A liquid crystal device includes: a liquid crystal layer which is sandwiched between a pair of substrates; a color filter layer has a first coloration layer for transmitting a first light and a second coloration layer for transmitting a second light; first electrodes has a first pixel electrode disposed on a first sub-pixel region corresponding to a planar region of the first coloration layer and a second pixel electrode disposed on a second sub-pixel region corresponding to a planar region of the second coloration layer; and second electrodes each of which faces each first electrode. Any one electrode of each first electrode and each second electrode has a plurality of band-like portions which are arranged at predetermined intervals. A layer thickness of the liquid crystal layer, a width of each band-like portion, and the predetermined intervals within the first sub-pixel region are smaller than they within the second sub-pixel region.

10 Claims, 11 Drawing Sheets

V-T CURVE OF LIQUID CRYSTAL DEVICE ACCORDING TO FOURTH EMBODIMENT

V-T CURVE OF KNOWN LIQUID CRYSTAL DEVICE

LIQUID CRYSTAL DEVICE AND ELECTRONIC APPARATUS

BACKGROUND

1. Technical Field

The present invention relates to a liquid crystal device and an electronic apparatus.

2. Related Art

Examples of methods of achieving an increase in the angle of view of known liquid crystal devices include a mode (hereinafter, it is referred to as a transverse electric field mode) for controlling the alignment of liquid crystal molecules by applying an electric field along the surface of a substrate to a liquid crystal layer. For example, an FFS (Fringe-Field Switching) mode has been known as the transverse electric field mode (Japanese Patent No. 3498163). A liquid crystal device using such a transverse electric field mode is configured to generate a transverse electric field in a liquid crystal layer by applying a voltage between a pair of electrodes formed on one of a pair of substrates sandwiching the liquid crystal layer. By adopting such a configuration, liquid crystal molecules in the liquid crystal layer are rotated in a horizontal direction with respect to the substrate. In addition, phase difference is applied to linear polarization by anisotropy of birefringence of the liquid crystal layer. In such a manner, the liquid crystal device using the transverse electric field mode performs display.

One of the problems of such a transverse electric field mode liquid crystal device is wavelength dispersion of the liquid crystal layer (liquid crystal material), that is, wavelength dependency of a birefringent index. Generally, the liquid crystal device performing color display uses coloration layers (color filters) of the three primary colors of red, green, and blue, thereby obtaining light of any one wavelength region of the three primary colors for each pixel (sub-pixel). In this case, when a configuration of the pixel (sub-pixel) such as an optimum layer thickness of the liquid crystal layer is set for green light, applied phase difference is different for each of blue light and red light (when the same voltage is applied). This causes difference in a curve of voltage-transmittance characteristics (hereinafter, it is referred to as a "V-T characteristics"). As a result, the phenomenon may arise that a color appears in a white display mode.

FIG. 14 is a diagram illustrating the V-T characteristics of such a known FFS mode liquid crystal device, that is, a FFS mode liquid crystal device in which the optimum layer thickness and the like of the liquid crystal layer is set for green light and is set as a common value for the three primary colors. Since the birefringent indices of the three primary colors are different, the V-T characteristics do not overlap with each other. As a result, since transmittance at the same applied voltage is different for each color, a color may appear in the white display mode. In order to solve the above-mentioned phenomenon, Japanese Unexamined Patent Application Publication No. 2008-90280 discloses a method of setting each angle of band-like electrodes to be different for each sub-pixel of red, green, and blue.

Such a method has an advantage in the improvement of V-T characteristic. However, a problem arises in that transmittance is reduced.

SUMMARY

An advantage of some aspects of the invention is to solve at least some of the above problems. The aspects of the invention can be realized by the following aspects or application examples.

APPLICATION EXAMPLE 1

According to an aspect of the invention, a liquid crystal device includes: a pair of substrates which are formed of a first substrate and a second substrate disposed to face each other; a liquid crystal layer which is sandwiched between the pair of substrates; a color filter layer which is formed on the second substrate and has at least a first coloration layer for transmitting light of a first wavelength region and a second coloration layer for transmitting light of a second wavelength region on the longer wavelength side than the first wavelength region; first electrodes each of which is formed on the first substrate and has at least a first pixel electrode disposed on a first sub-pixel region corresponding to a planar region of the first coloration layer and a second pixel electrode disposed on a second sub-pixel region corresponding to a planar region of the second coloration layer; and second electrodes each of which faces each first electrode with a dielectric layer interposed therebetween. Any one electrode of each first electrode and each second electrode has a plurality of band-like portions which are arranged at predetermined intervals in parallel to each other in the first and second sub-pixel regions. A layer thickness of the liquid crystal layer within the first sub-pixel region is smaller than a layer thickness of the liquid crystal layer within the second sub-pixel region. A width of each band-like portion within the first sub-pixel region is smaller than a width of each band-like portion within the second sub-pixel region. The predetermined intervals within the first sub-pixel region are smaller than the predetermined intervals within the second sub-pixel region.

The liquid crystal device is able to suppress difference in V-T characteristics of sub-pixel regions caused by birefringence of the liquid crystal layer by changing the layer thickness of the liquid crystal layer in accordance with wavelengths. In addition, the liquid crystal device is able to suppress deterioration in transmittance caused by the change of the layer thickness of the liquid crystal layer by changing the predetermined interval and the widths of the band-like portions of the sub-pixel regions. Accordingly, according to the liquid crystal device having such a configuration, it is possible to improve V-T characteristics while suppressing deterioration in transmittances.

APPLICATION EXAMPLE 2

In the liquid crystal device according to this aspect of the invention, it is preferred that a layer thickness of the dielectric layer within the first sub-pixel region be smaller than a layer thickness of the dielectric layer within the second sub-pixel region.

The liquid crystal device is able to enhance an electric field formed between the first electrodes and the second electrodes by decreasing the layer thickness of the dielectric layer. Thus, according to the liquid crystal device having such a configuration, it is possible to further suppress the above-mentioned deterioration in transmittance and display a more appropriate image.

APPLICATION EXAMPLE 3

In the liquid crystal device according to this aspect of the invention, it is preferred that values of at least one item of the total four items of the layer thickness of the liquid crystal layer, the width of the band-like portion, the predetermined intervals, and the layer thickness of the dielectric layer satisfy the following relationship: a ratio of the value of the item within the first sub-pixel region to the value of the item within the second sub-pixel region is approximately equal to a ratio of $\lambda_1 \cdot \Delta n(\lambda_2)$ to $\lambda_2 \cdot \Delta n(\lambda_1)$. Here, $\lambda_1$ is a peak wavelength of the first wavelength region, $\lambda_2$ is a peak wavelength of the second wavelength region, $\Delta n(\lambda_2)$ is a refractive index anisotropy of the liquid crystal layer at the peak wavelength $\lambda_2$, and $\Delta n(\lambda_1)$ is a refractive index anisotropy of the liquid crystal layer at the peak wavelength $\lambda_1$.

According to the liquid crystal device having such a configuration, it is possible to compensate deterioration in transmittance caused by the change of the layer thickness of the liquid crystal layer with substantially the same ratio as an amount of the deterioration. Accordingly, it is possible to further appropriately suppress the deterioration in transmittance, and thus it is possible to display a more appropriate image.

APPLICATION EXAMPLE 4

In the liquid crystal device according to this aspect of the invention, it is preferred that a layer thickness of the first coloration layer be larger than a layer thickness of the second coloration layer. In addition, it is also preferred that at least a part of a difference between the layer thickness of the liquid crystal layer within the first sub-pixel region and the layer thickness of the liquid crystal layer within the second sub-pixel region be formed by a difference between the layer thickness of the first coloration layer and the layer thickness of the second coloration layer.

According to the liquid crystal device having such a configuration, it is possible to change the layer thickness of the liquid crystal layer for each sub-pixel region without other components. Accordingly, it is possible to display a more appropriate image while suppressing an increase in the manufacturing cost of the liquid crystal device.

APPLICATION EXAMPLE 5

In the liquid crystal device according to this aspect of the invention, it is preferred that a liquid-crystal-thickness adjustment layer be formed in the first sub-pixel region on a side of the second substrate facing the liquid crystal layer. In addition, it is also preferred that at least a part of a difference between the layer thickness of the liquid crystal layer within the first sub-pixel region and the layer thickness of the liquid crystal layer within the second sub-pixel region be formed by the liquid-crystal-thickness adjustment layer.

According to the liquid crystal device having such a configuration, it is possible to change the layer thickness of the liquid crystal layer for each sub-pixel region without changing the layer thicknesses of other components. Accordingly, it is possible to display a more appropriate image.

APPLICATION EXAMPLE 6

In the liquid crystal device according to this aspect of the invention, it is preferred that a liquid-crystal-thickness adjustment layer be formed in the first sub-pixel region on a side of the second substrate facing the liquid crystal layer. In addition, it is also preferred that a liquid-crystal-thickness adjustment layer be formed in the second sub-pixel region on the side of the second substrate facing the liquid crystal layer so as to be thinner than the liquid-crystal-thickness adjustment layer which is formed in the first sub-pixel region. In addition, it is also preferred that at least a part of a difference between the layer thickness of the liquid crystal layer within the first sub-pixel region and the layer thickness of the liquid crystal layer within the second sub-pixel region be formed by a difference between the liquid-crystal-thickness adjustment layer formed in the first sub-pixel region and the liquid-crystal-thickness adjustment layer formed on the second sub-pixel region.

According to the liquid crystal device having such a configuration, it is possible to change the layer thicknesses of the liquid crystal layer of the second sub-pixel region and the other sub-pixel region. Accordingly, it is possible to display a more appropriate image.

APPLICATION EXAMPLE 7

In the liquid crystal device according to this aspect of the invention, it is preferred that the first wavelength region be a wavelength region corresponding to blue light. In addition, it is also preferred that the second wavelength region be a wavelength region corresponding to green light. In addition, it is also preferred that the liquid crystal device further comprise: a third coloration layer which transmits light of a wavelength region corresponding to red light; and a third sub-pixel region which corresponds to a planar region of the third coloration layer.

According to the liquid crystal device having such a configuration, it is possible to display a more appropriate color image.

APPLICATION EXAMPLE 8

In the liquid crystal device according to this aspect of the invention, it is preferred that values of at least one item of the total four items of the layer thickness of the liquid crystal layer, the width of the band-like portion, the predetermined intervals, and the layer thickness of the dielectric layer satisfy the following relationship: a ratio of the value of the item within the second sub-pixel region to the value of the item within the third sub-pixel region is approximately equal to a ratio of $\lambda_2 \cdot \Delta n(\lambda_3)$ to $\lambda_3 \cdot \Delta n(\lambda_2)$. Here, $\lambda_3$ is a peak wavelength of the wavelength region corresponding to the red light, and $\Delta n(\lambda_3)$ is a refractive index anisotropy of the liquid crystal layer at the peak wavelength $\lambda_3$.

According to the liquid crystal device having such a configuration, it is possible to compensate deterioration in transmittance caused by the change of the layer thickness of the liquid crystal layer with substantially the same ratio as an amount of the deterioration. Accordingly, it is possible to further appropriately suppress the deterioration in transmittance, and thus it is possible to display a more appropriate color image.

APPLICATION EXAMPLE 9

In the liquid crystal device according to this aspect of the invention, it is preferred that a layer thickness of the second coloration layer be larger than a layer thickness of the third coloration layer. In addition, it is also preferred that at least a part of a difference between the layer thickness of the liquid crystal layer within the second sub-pixel region and the layer thickness of the liquid crystal layer within the third sub-pixel region be formed by a difference between the layer thickness of the second coloration layer and the layer thickness of the third coloration layer.

According to the liquid crystal device having such a configuration, it is possible to change the layer thickness of the liquid crystal layer for each sub-pixel region without other components. Accordingly, it is possible to display a more appropriate color image while suppressing an increase in the manufacturing cost of the liquid crystal device.

APPLICATION EXAMPLE 10

In the liquid crystal device according to this aspect of the invention, it is preferred that a liquid-crystal-thickness adjustment layer be formed in the second sub-pixel region on a side of the second substrate facing the liquid crystal layer. In addition, it is also preferred that at least a part of a difference between the layer thickness of the liquid crystal layer within the second sub-pixel region and the layer thickness of the liquid crystal layer within the third sub-pixel region be formed by the liquid-crystal-thickness adjustment layer.

According to the liquid crystal device having such a configuration, it is possible to change the layer thickness of the liquid crystal layer for each sub-pixel region without changing the layer thicknesses of other components. Accordingly, it is possible to display a more appropriate color image.

APPLICATION EXAMPLE 11

According to another aspect of the invention, an electronic apparatus includes a display section which is provided with the above-mentioned liquid crystal device.

According to the liquid crystal device having such a configuration, it is possible to display a more appropriate image for an observer.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a transmissive color liquid crystal device (hereinafter, it is referred to as a "liquid crystal device") using a FFS mode according to a first embodiment will be described with reference to the accompanying drawings. Furthermore, in all the following drawings, since the size of each component is set to be recognizable on the drawings, the dimensions and proportions of each component are properly set to be different from actual dimensions and proportions.

Figure 1:
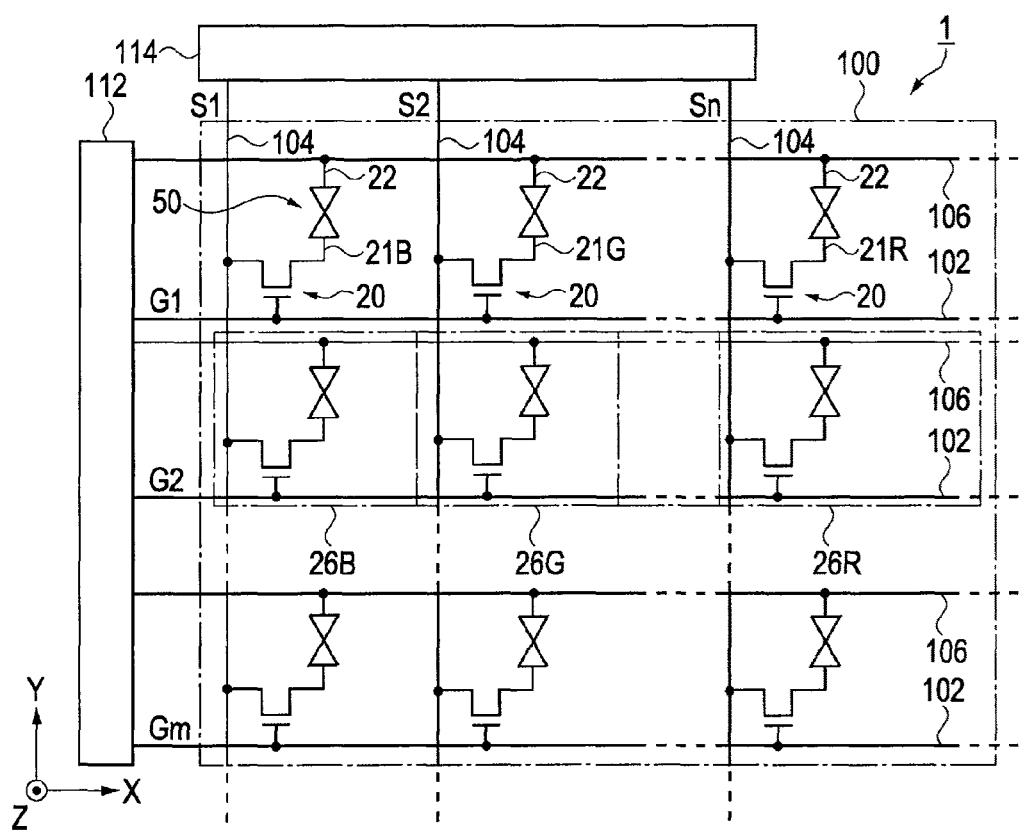
FIG. 1 is a circuit diagram of a liquid crystal device according to a first embodiment.

FIG. 1 is a circuit diagram of a liquid crystal device 1 according to the embodiment. Each of a plurality of sub-pixels 26 regularly arranged in a display region 100 of the liquid crystal device 1 is provided with a pixel electrode 21 as a first electrode capable of applying a voltage between itself and a common electrode 22 as a second electrode; and a TFT (thin film transistor) 20 for controlling switching of the pixel electrode 21. The common electrode 22 is electrically connected to common lines 106 extending from a scanning line driving circuit 112, and maintains a common electric potential in all the sub-pixels 26, that is, in the whole area of the display region 100. Furthermore, the reference signs B, G, and R additionally noted on the sub-pixels 26 will be described later.

Data lines 104 extending from a data line driving circuit 114 are electrically connected to source electrodes 20s (refer to FIG. 4) of TFTs 20. Here, an extending direction of the data lines 104 is defined as a Y direction. The data line driving circuit 114 supplies image signals S1, S2, . . . , Sn to the sub-pixels 26 through the data lines 104. The image signals S1 to Sn may be line-sequentially supplied in this order, and may be supplied for each group of the plurality of data lines 104 adjacent to each other.

Scanning lines 102 extending from the scanning line driving circuit 112 are electrically connected to gate electrodes 20g (refer to FIG. 4) of the TFTs 20. Here, an extending direction of the scanning lines 102 is defined as an X direction.

The scanning line driving circuit 112 supplies scanning signals G1, G2, . . . , Gm as pulse signals to the scanning lines 102 at predetermined timing, and the signals are line-sequentially applied in this order to gate electrodes 20g of the TFTs 20. The pixel electrodes 21 are electrically connected to the corresponding drain electrodes 20d of the TFTs 20. The image signals S1, S2, . . . , Sn supplied from the data lines 104 are written into the pixel electrodes 21 at predetermined timing by turning on the TFTs 20 as switching elements during a predetermined period by the input of the scanning signals G1, G2, . . . , Gm. The image signals S1, S2, . . . Sn, which have predetermined levels written into the liquid crystal through the pixel electrodes 21, are maintained during a predetermined period between the pixel electrodes 21 and the common electrodes 22 which face the pixel electrodes 21 through the liquid crystal layer 55 (refer to FIG. 4).

Furthermore, as described later (refer to FIG. 3), a part of each data line 104 patterned in a branch shape functions as a source electrode 20s in the liquid crystal device 1 of the embodiment, and a partial area of each scanning line 102 functions as a gate electrode 20g.

Figure 2:
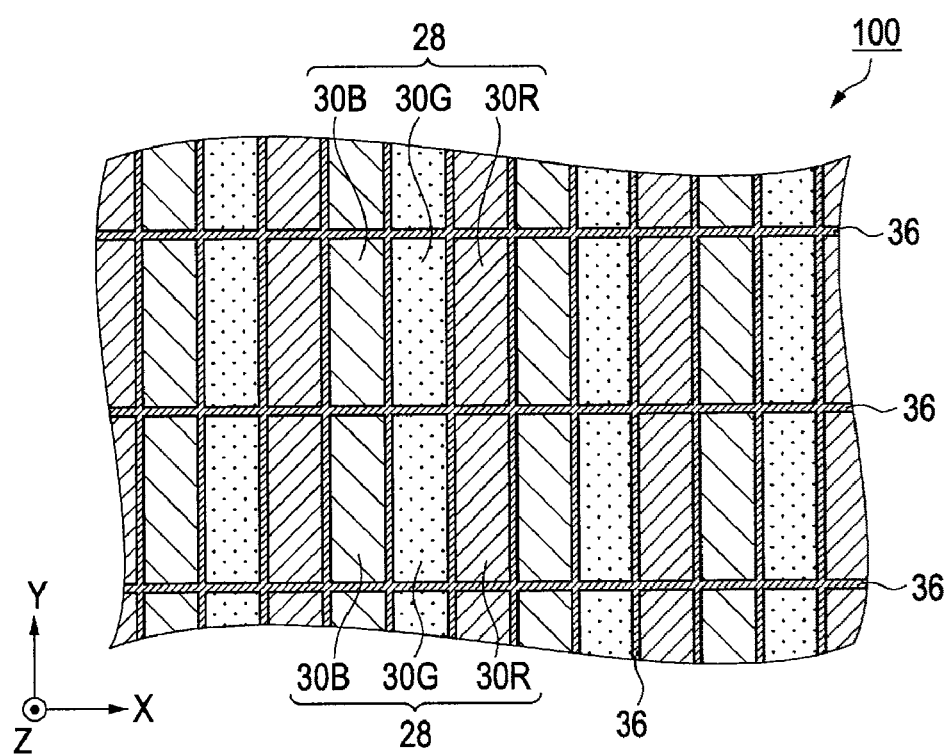
FIG. 2 is a top plan view of an enlarged part of a display region of a first liquid crystal device.

FIG. 2 is a top plan view of an enlarged part of the display region 100 of the liquid crystal device 1. The drawing is a diagram of the liquid crystal device 1 viewed by an observer, more specifically, viewed from the normal direction of a counter substrate 11 (refer to FIG. 4) to be described later. In this description, the view from the normal direction of the counter substrate 11 is also referred to as the "plan view". Furthermore, the normal direction of the counter substrate 11 is defined as a Z direction. The display region 100 includes blue sub-pixel regions 30B, green sub-pixel regions 30G, and red sub-pixel regions 30R which are regularly arranged thereon. Each blue sub-pixel region 30B, which has a substantially rectangular shape in plan view, serves as a first sub-pixel region for emitting blue light toward an observer side. Each green sub-pixel region 30G serves as a second sub-pixel region for emitting green light. Each red sub-pixel region 30R serves as a third sub-pixel region for emitting red light. The three type sub-pixel regions 30 constitute a pixel region 28.

In the following description, the three type sub-pixel regions (30B, 30G, and 30R) are simply called "sub-pixel regions 30" as a generic name by omitting the alphabet letters. Likewise, generic names are given to other components (such as color filters 35 to be described later) by omitting the alphabet letters representing the colors of light.

Each sub-pixel region 30 is a region capable of emitting light of any one of the above-mentioned three primary colors at an arbitrary intensity, and is planar in concept. The pixel region 28 is also planar in concept, and is a minimum unit capable of emitting light having an arbitrary wavelength distribution at an arbitrary intensity. The pixels and the sub-pixels 26 include TFTs 20 in functional concept.

Colors of the above-mentioned emitted light are created by coloration layers 35 (refer to FIG. 5) which are respectively disposed in the sub-pixel regions 30. The coloration layers 35 (hereinafter, it is referred to as a "color filter") are partitioned by a light shielding layer 36 (hereinafter, it is referred to as a "black matrix") for absorbing visible light in plan view. Since the sub-pixel regions 30 are arranged in a matrix, a black matrix 36 has a lattice shape. Accordingly, the color filters 35 and the sub-pixel regions 30 are configured to substantially coincide with each other in plan view, and the sub-pixel regions 30 are partitioned by the black matrix 36 in plan view. The combination of the color filters 35 arranged to correspond to the sub-pixel regions 30 and the black matrix 36 partitioning the color filters is defined as a color filter layer 33.

Furthermore, an aspect of the arrangement of the sub-pixel regions 30 is not limited to a matrix shape, but may be, for example, a zigzag shape. Further, the three type sub-pixel regions 30 (B, G, and R) may be formed in different shapes in plan view.

Hereinafter, configuration of the pixel region 28 of the liquid crystal device 1 according to the embodiment will be described with reference to FIGS. 3 to 5.

Figure 3:
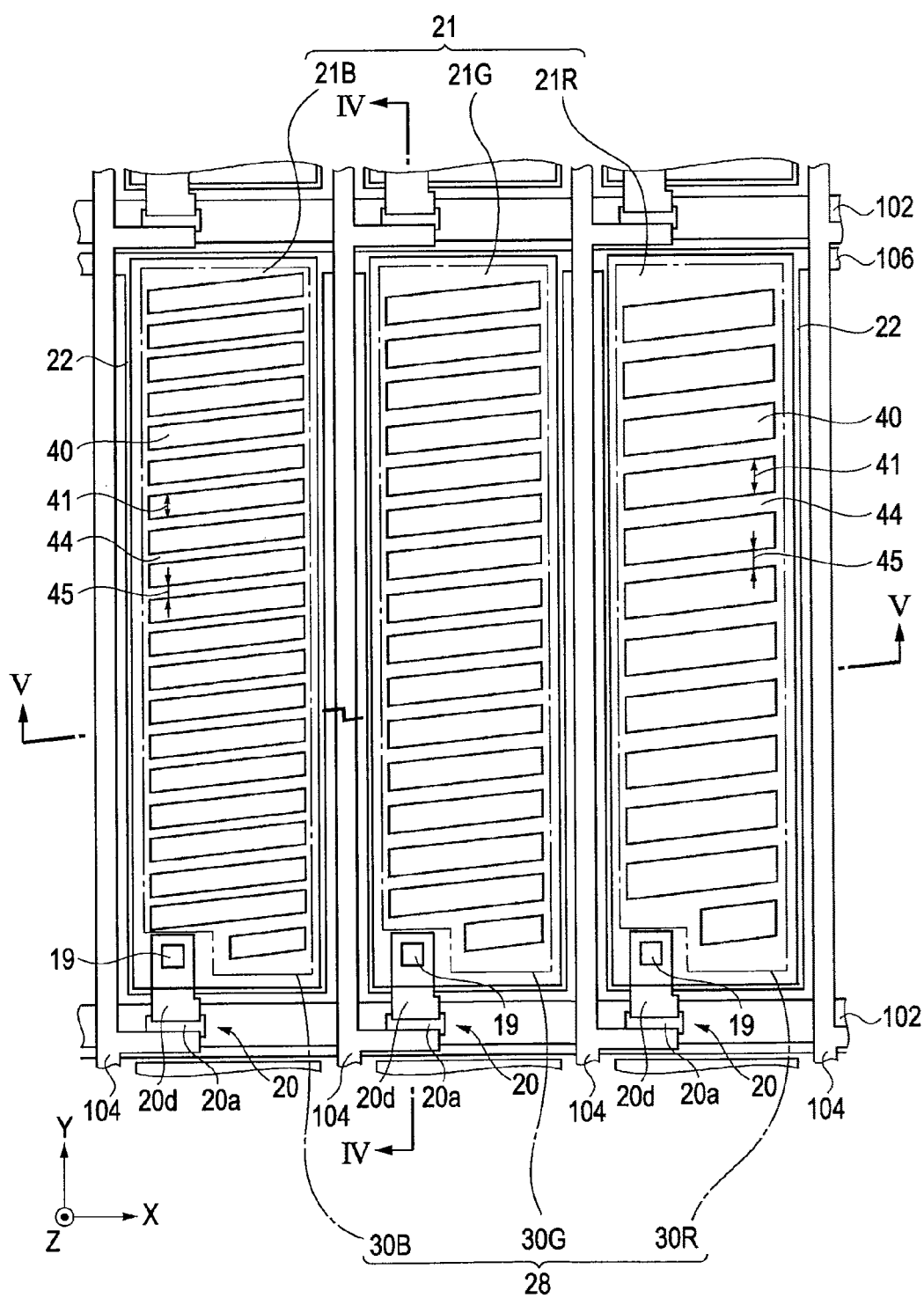
FIG. 3 is a schematic top plan view of the liquid crystal device according to the first embodiment.

FIG. 3 is a view schematically illustrating a planar configuration of the pixel region 28 of the liquid crystal device 1 according to the embodiment, and is a view of an array substrate 10 (refer to FIG. 4), which will be described later, viewed from the normal direction. The pixel region 28 includes a red sub-pixel region 30R, a green sub-pixel region 30G, and a blue sub-pixel region 30B. In FIG. 3, the color filters 35 and the like formed on the counter substrate 11 are not shown.

Figure 4:
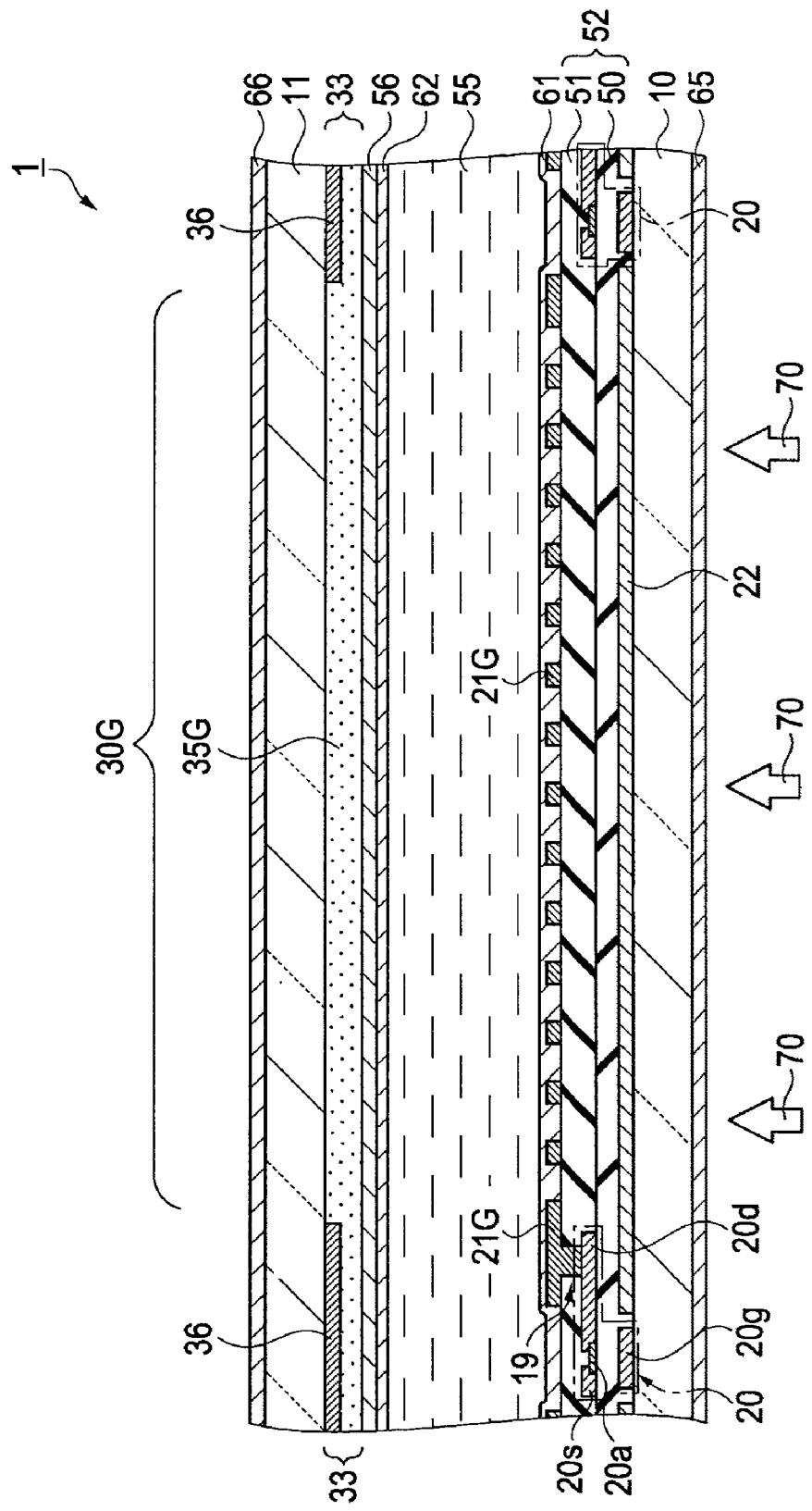
FIG. 4 is a schematic sectional view of the liquid crystal device according to the first embodiment.

FIG. 4 is a schematic sectional view of the liquid crystal device 1 taken along the line IV-IV shown in FIG. 3, and is a view schematically illustrating the section of the green sub-pixel 26G (refer to FIG. 5) together with irradiated light 70 from a backlight not shown in the drawing.

Figure 5:
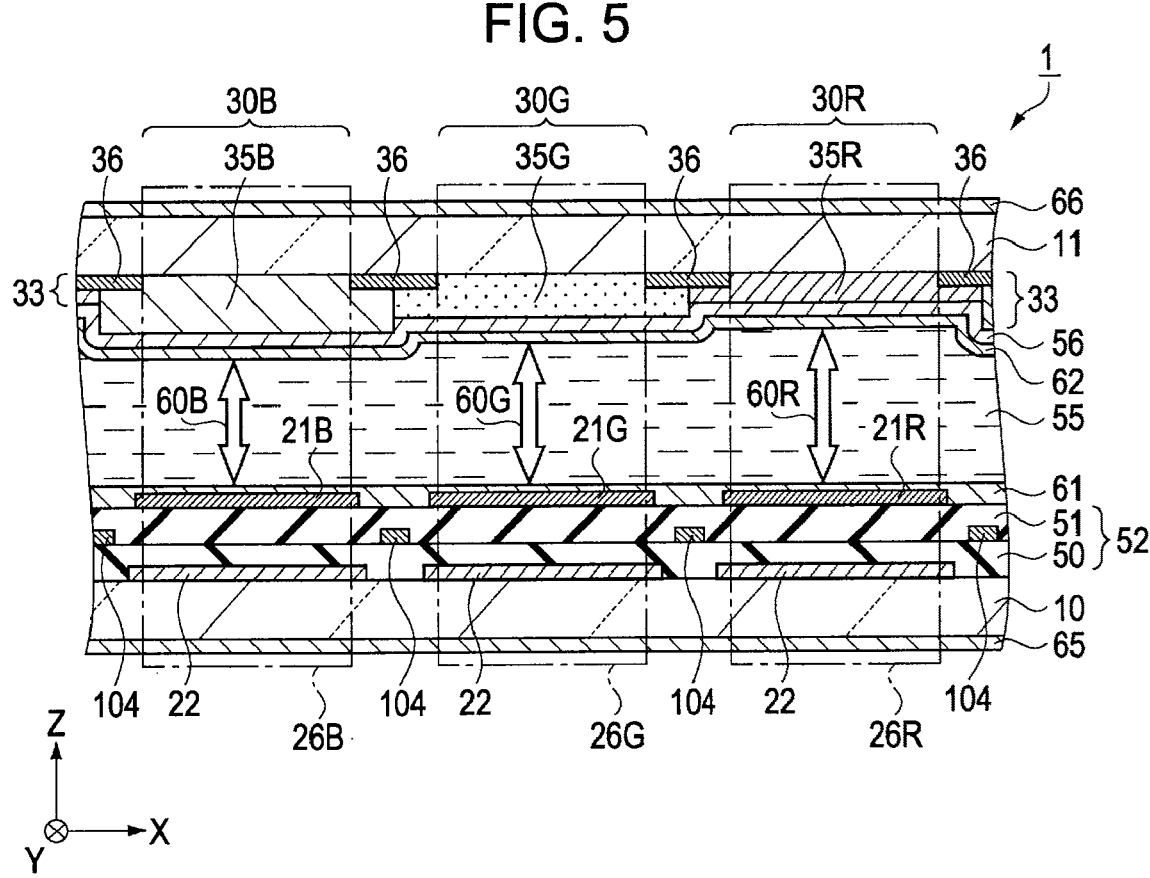
FIG. 5 is a schematic sectional view of the liquid crystal device according to the first embodiment.

FIG. 5 is a schematic sectional view of the liquid crystal device 1 taken along the line V-V shown in FIG. 3, and is a view illustrating the difference of layer thicknesses of the color filters 35 in the sub-pixels 26. Furthermore, FIG. 5 and FIGS. 7, 10, 12, and 16 to be described later do not show the irradiated light 70.

As shown in FIG. 3, each of the sub-pixel regions 30 includes the pixel electrode 21, the common electrode 22, and the TFT 20 formed thereon. The pixel electrode 21 has a planar ladder shape (which is a shape in plan view). The common electrode 22 is formed on a position substantially overlapping with the pixel electrode in plan view, and has a substantially rectangular shape. The TFT 20 serves as a switching element for controlling the pixel electrode 21. Since each shape of the pixel electrodes 21 in plan view is different for each sub-pixel region 30 as described later, the corresponding reference numerals are individually given thereto.

The pixel electrode 21 formed in the blue sub-pixel region 30B is a first pixel electrode 21B. The pixel electrode 21 formed in the green sub-pixel region 30G is a second pixel electrode 21G. The pixel electrode 21 formed in the red sub-pixel region 30R is a third pixel electrode 21R. Hereinafter, the "pixel electrode 21" is a generic name of the above-mentioned three type pixel electrodes 21 (B, G, and R).

Both electrodes (the pixel electrode 21 and the common electrode 22) are formed to overlap with each other in plan view in the substantially rectangular area. The area is formed by the scanning lines 102 and the data lines 104 substantially orthogonal to each other on a surface of the array substrate 10 facing the liquid crystal layer 55. The common electrode 22 is formed close to the array substrate 10 as shown in FIG. 4, and thus both electrodes are electrically insulated from each other by a dielectric layer 52.

In the liquid crystal device 1 according to the embodiment and the liquid crystal devices according to the second to fourth embodiments to be described later, planar shapes of components constituting the three type sub-pixels 26 (B, G, and R) except for planar shape of the pixel electrode 21 are common. However, the embodiment of the invention is not limited to the above-mentioned aspect, components having different planar shapes in the three type sub-pixels 26 (B, G, and R) may be used.

As shown in FIGS. 3 and 4, the TFTs 20 are formed in the vicinities of the intersection portions between the scanning lines 102 and the data lines 104, and are respectively electrically connected to the data lines 104 and the pixel electrodes 21. As described above, the extending direction of the scanning line 102 is defined as the X direction, and the extending direction of the data line 104 is defined as the Y direction.

Each TFT 20 includes a semiconductor layer 20a, the source electrode 20s, the drain electrode 20d, a gate insulation layer 50, and the gate electrode 20g. The semiconductor layer 20a is made of island-like amorphous silicon. The source electrode 20s is formed by creating a branch in the data line 104 so as to make a part of the data line 104 overlap with the semiconductor layer 20a in plan view. The drain electrode 20d has an island shape patterned so as to overlap with a part of the semiconductor layer 20a and a part of the pixel electrode 21 in plan view. The gate electrode 20g is a part of the scanning line 102. A region of the scanning line 102 faces the semiconductor layer 20a with the gate insulation layer 50 interposed therebetween. The region functions as the gate electrode 20g of the TFT 20.

An interlayer insulation layer 51 is formed on the side of the TFT 20 facing the liquid crystal layer 55, and the pixel electrode 21 is formed on the side of the interlayer insulation layer facing the liquid crystal layer 55. In addition, the drain electrode 20d and the pixel electrode 21 of the TFT 20 are electrically connected to each other via a contact hole 19 formed by etching the interlayer insulation layer 51 in a region in which both overlap with each other in plan view.

The common electrode 22 has a flat plate shape, and is made of ITO (Indium Tin Oxide) which is a transparent conductive material. In addition, the common electrodes 22 are electrically connected to each other via the common lines 106 extending substantially parallel to the scanning line 102. Accordingly, all the common electrodes 22 regularly arranged in the display region 100 (refer to FIG. 1) have an equivalent potential.

The common electrodes 22 are formed on the side of the array substrate 10 facing the liquid crystal layer 55. The above-mentioned semiconductor layer and data lines 104 are formed on the side of the gate insulation layer 50 facing the liquid crystal layer 55. The gate insulation layer 50 is formed on the side of the common electrode facing the liquid crystal layer 55. In addition, the interlayer insulation layer 51 is formed on the side of the gate insulation layer facing the liquid crystal layer 55. The pixel electrode 21 is formed on the side of the interlayer insulation layer facing the liquid crystal layer 55. Accordingly, a laminated body of the gate insulation layer 50 and the interlayer insulation layer 51 is formed between the pixel electrode 21 and the common electrode 22. The laminated body is a dielectric layer 52. When a voltage is applied to the pixel electrode 21, an electric field is generated between the pixel electrode 21 and the common electrode 22 through the dielectric layer 52.

The pixel electrode 21 is made of ITO similarly to the common electrode 22. The outer peripheral shape of the pixel electrode 21 is rectangular similarly to the common electrode 22, and has slits 40 regularly arranged with a predetermined width, that is, has a region in which the ITO is removed at the time of patterning. Due to the slits 40, the pixel electrode 21 is formed in a ladder shape in plan view as described above. Furthermore, the sub-pixel region 30 is a region indicated by the chain line of FIG. 3, and substantially coincides with the region remaining when a region overlapping with the contact hole 19 is excluded from a region where the pixel electrode 21 is formed.

The slits 40 are inclined at 5 degrees with respect to the X direction, and are patterned substantially parallel to each other except for both ends thereof. Accordingly, each slit has a substantially parallelogram shape in plan view. The slits 40 having identical shapes are continuously arranged at equal intervals in Y direction in the pixel electrode 21. Accordingly, in the pixel electrode 21, the plural band-like portions 44 having predetermined widths are continuously arranged in parallel to each other in the Y direction, and both sides of each band-like portion in the Y direction are sandwiched by the slits 40. The slits 40 are formed at equal intervals, and thus the widths of the band-like portions 44 are equal to each other in each pixel electrode 21 of the sub-pixels 26. In addition, the predetermined widths of the slits 40 are the predetermined intervals between the band-like portions 44 adjacent to each other.

The above-mentioned width of the slit (hereinafter, it is referred to as a "slit width 41") and the above-mentioned width of the band-like portion (hereinafter, it is referred to as a "band-like portion width 45") are different for each color of the emitted light, that is, the widths are different for each pixel electrode 21 (B, G, and R) provided in each sub-pixel 26 (B, G, and R).

Specifically, in the first pixel electrode 21B, the band-like portion width 45 is 2.4 μm, and the slit width 41 is 4.0 μm. In the second pixel electrode 21G, the band-like portion width 45 is 3.0 μm, and the slit width 41 is 5.0 μm. In the third pixel electrode 21R, the band-like portion width 45 is 3.9 μm and the slit width 41 is 6.5 μm. A method of setting the numerical values will be described later.

As shown in FIGS. 4 and 5, the array substrate 10 and the counter substrate 11 are disposed at a predetermined interval, and the gap between both substrates is filled with the liquid crystal layer 55. Since the liquid crystal device 1 is a transmissive type, both substrates are made of a transparent material such as glass or quartz. The color filter layer 33 including the black matrix 36 and the color filters 35 is formed on the side of the counter substrate 11 facing the liquid crystal layer 55.

The color filters 35 transmit light of a predetermined wavelength region and absorb light of the other wavelength regions, from white light irradiated by the backlight, that is, light of a wide wavelength region. In such a manner, each color filter 35 performs a function of turning white light into colored light, and also performs a function of adjusting the layer thickness (the size of the pair of substrates in the normal direction) of the liquid crystal layer 55 as described later. In addition, the color filters 35 having colors corresponding to the emitted light of the sub-pixel region are formed in the corresponding sub-pixel regions 30.

Specifically, a blue color filter 35B as a first coloration layer for transmitting light of a wavelength region of which a peak wavelength corresponds to blue light of 450 nm is formed in the blue sub-pixel region 30B. A green color filter 35G as a second coloration layer for transmitting light of a wavelength region of which a peak wavelength corresponds to green light of 530 nm is formed in the green sub-pixel region 30G. A red color filter 35R as a third coloration layer for transmitting light of a wavelength region of which a peak wavelength corresponds to red light of 640 nm is formed in the red sub-pixel region 30R.

Furthermore, in the liquid crystal device 1 according to the embodiment, the layer thicknesses of the color filters 35 of sub-pixels 26 are different from each other. As shown in FIG. 5, the blue color filter 35B is thickest, and the red color filter 35R is thinnest.

The black matrix 36 is formed to overlap with a region not overlapping with the sub-pixel regions 30 in plan view, that is, to overlap, in plan view, with a region in which the scanning lines 102 and data lines 104 are formed. The color filters 35 are formed over the whole area of the display region 100 (refer to FIG. 1) including the black matrix formation region. The black matrix 36 performs a function of absorbing irradiated light 70 so as not to transmit the light to the absorber side in a region in which the pixel electrodes 21 are not formed, that is, a region in which a transmission amount (transmittance) of the irradiated light cannot be controlled. Furthermore, it is possible to adopt a configuration in which the color filters 35 are formed in only the range partitioned by the black matrix 36.

A planarization layer 56 and a second alignment layer 62 are sequentially formed on the side of the color filter 35 facing the liquid crystal layer 55. The planarization layer 56 has a function of suppressing step differences formed in regions in which the above-mentioned black matrix 36 and color filters 35 overlap with each other or regions in which color filters 35 of different colors overlap with each other. A first alignment layer 61 is formed on the side of the pixel electrode 21 facing the liquid crystal layer 55, and the liquid crystal layer 55 is sandwiched by the first alignment layer 61 and the second alignment layer 62. An interval between the first alignment layer 61 and the second alignment layer 62 in the normal direction is a cell thickness 60. The "cell thickness 60" has the two meanings of the above-mentioned "interval" and the size of the interval.

The difference of the layer thicknesses of the color filters 35 mentioned above causes the difference of the cell thicknesses 60 of the sub-pixels 26. Specifically, a cell thickness 60B of a blue sub-pixel 26B is 2.4 μm, and a cell thickness 60G of a green sub-pixel 26G is 3.0 μm, and a cell thickness 60R of the red sub-pixel 26R is 3.9 μm.

In the liquid crystal device 1 according to the embodiment, only the color filters 35 in the sub-pixels 26 are different in size in the normal direction of the substrate. Accordingly, the layer thicknesses of the color filters 35 are set so as to form the cell thicknesses 60. A method of determining the cell thicknesses 60 (layer thicknesses) will be described later.

The liquid crystal layer 55 fills the gap between the array substrate 10 and the counter substrate 11. The liquid crystal layer 55 has a birefringent index Δn of 0.12 when a wavelength of light is 589 nm. The birefringent index Δn depends on a wavelength. For example, Δn is 0.133 when a peak wavelength of blue light is 450 nm, Δn is 0.125 when a peak wavelength of green light is 530 nm, and Δn is 0.117 when a peak wavelength of red light is 640 nm.

The first and second alignment layers 61 and 62 sandwiching the liquid crystal layer 55 are subjected to an anti-parallel rubbing process in parallel and anti-parallel to the extending direction of the scanning line 102, that is, the X direction. In such a manner, the orientation of the liquid crystal molecules contained in the liquid crystal layer 55 is set as a homogeneous orientation. The first polarizer 65 is disposed on the side of the array substrate 10 opposite the liquid crystal layer 55. The second polarizer 66 is disposed on the side of the counter substrate 11 opposite the liquid crystal layer 55. The liquid crystal device 1 is a normally-black mode liquid crystal device. The first and second polarizers 65 and 66 are disposed so that the transmission axes thereof are orthogonal to each other. Specifically, the transmission axis of the first polarizer 65 is set to an X direction, and the transmission axis of the second polarizer 66 is set to the Y direction.

As described above, the pair of alignment layers 61 and 62 are subjected to the alignment process in the X direction, and the liquid crystal molecules contained in the liquid crystal layer 55 are oriented approximately in the X direction when a voltage is not applied between the pair of electrodes. The irradiated light 70 is linearly polarized in a direction of the transmission axis of the first polarizer by passing through the first polarizer 65, and is incident on the liquid crystal layer 55. At this time, a voltage may not be applied between the pair of electrodes. That is, the orientation direction of the liquid crystal molecules contained in the liquid crystal layer 55 may be approximately the same as the X direction. In such a case, the light exits from the liquid crystal layer 55 while maintaining approximately the same direction as the polarization direction at the time of incidence. Then, the light is absorbed by the second polarizer 66 having the transmission axis orthogonal to the polarization direction.

In contrast, a voltage may be applied between the pair of electrodes. In such a case, the liquid crystal molecules contained in the liquid crystal layer 55 are rotated in a clockwise direction in accordance with the magnitude of the applied voltage. Phase difference according to the magnitude of the rotation angle is given to the irradiated light 70 incident on the liquid crystal layer 55. Thus, the light is polarized in a direction inclined at a certain angle to the X direction, and is incident on the second polarizer 66. Then, some light is transmitted through the second polarizer 66, and is emitted toward an observer. Here, the percentage of the transmitted light depends on the above-mentioned angle.

In the liquid crystal device 1 according to the embodiment, dimensions of the components are adjusted so that the phase difference generated by the liquid crystal layer 55 is set optimally for each of the three primary colors. The V-T characteristics of the three primary colors are set to be substantially the same by such an adjustment, thereby improving coloring at the time of display.

As described above, the liquid crystal layer gives phase difference, that is, retardation to the light transmitted through the first polarizer 65. Assuming that a refractive index of the liquid crystal layer is Δn and a thickness of the liquid crystal layer, that is, a cell thickness 60, is d, the phase difference is expressed by multiplication of both (Δn·d). As described above, a value of Δn of the liquid crystal layer 55 in the liquid crystal device 1 according to the embodiment is different in accordance with a wavelength of the light transmitted through the liquid crystal layer 55. Therefore, the value of Δn becomes larger as the wavelength becomes shorter. Further, the phase difference to be applied is in proportion to the wavelength. Therefore, the value thereof becomes smaller as the wavelength becomes shorter. Accordingly, the cell thickness 60 of the blue sub-pixel 26B is set smaller than that of the green sub-pixel 26G, and the cell thicknesses 60 of the green sub-pixel 26G is set smaller than that of the red sub-pixel 26R. In such a manner, the phase differences corresponding to the three primary colors can be set preferably. For this reason, the liquid crystal device 1 according to the embodiment is configured so that the cell thickness 60R of 3.9 μm>the cell thickness 60G of 3.0 μm>the cell thickness 60B of 2.4 μm.

The above-mentioned numerical values are determined by the following calculation formula 1

$$\lambda_1 \cdot \Delta n(\lambda_2) : \lambda_2 \cdot \Delta n(\lambda_1) = d1 : d2 \qquad (1).$$

Here, $\lambda_1$ and $\lambda_2$ ($\lambda_1 < \lambda_2$) are the first and second peak wavelengths in a wavelength region of the transmitted light. The transmitted light is defined as light transmitted through (one trillion) color filters 35 which are formed on one trillion sub-pixel regions (the first sub-pixel region and the second sub-pixel region) for emitting light of mutually different wavelength regions, respectively. In addition, $\Delta n(\lambda_1)$ is a birefringent index at a wavelength of $\lambda_1$, $\Delta n(\lambda_2)$ is a birefringent index at a wavelength of $\lambda_2$, d1 is a cell thickness 60 of the sub-pixel 26 having the color filter 35 of the peak wavelength $\lambda_1$, and d2 is a cell thickness 60 of the sub-pixel 26 having the color filter 35 of the peak wavelength $\lambda_2$.

The calculation formula 1 is empirically derived, and thus the ratio of the cell thicknesses 60 of the blue sub-pixel 26B, the green sub-pixel 26G, and the red sub-pixel 26R is approximately equal to 8:10:13. In the liquid crystal device 1 according to the embodiment, the layer thicknesses of the color filters 35 of the sub-pixels 26 are changed so that the cell thicknesses 60 satisfy the ratio derived in the calculation formula 1, thereby obtaining the appropriate phase differences to be applied to the corresponding pixels.

Here, another problem may be encountered when the cell thicknesses 60 decrease. As described above, the liquid crystal molecules contained in the liquid crystal layer 55 are oriented in the X direction by the pair of alignment layers when a voltage is not applied between the pair of electrodes. In this case, orientation regulating the force of the alignment layer is at the maximum on the interface between the liquid crystal layer 55 and the alignment layer. Accordingly, the liquid crystal molecules near the interface are hard to affect with an electric field compared with the liquid crystal molecules far from the interface, and the rotation angle of the liquid crystal molecules near the interface decreases in the same electrical field. Specifically, it becomes hard to change the orientation direction. The effect produced by decrease in cell thickness 60 is hereinafter referred to as "effect of orientation regulating force". The decrease in cell thickness 60 means an increase in the ratio of the liquid crystal molecules near the interface to the total amount of the liquid crystal molecules filling a predetermined region, that is, a region overlapping with the pixel electrode 21 in plan view. As a result, transmittance may deteriorate when the same voltage is applied.

In order to solve such a problem, the liquid crystal device 1 according to the embodiment is configured so as to change the shape of the pixel electrode 21 for each pixel electrode 21 (B, G, and R) of the three type sub-pixels 26 (B, G, and R). With such a configuration, the deterioration in transmittance can be avoided. Specifically, in the liquid crystal device 1 according to the embodiment, regarding both the band-like portion width 45 and the interval therebetween, that is, the slit width 41, those of the third pixel electrode 21R are set larger (wider) than those of the second pixel electrode 21G and those of the second pixel electrode 21G are set larger (wider) than those of the first pixel electrode 21B, as described above. The intensity of the electric field imparted between the pixel electrode 21 and the common electrode 22 is at the maximum between the outer periphery of the band-like portion 44 and the common electrode 22. As a result, it is possible to rotate the liquid crystal molecules more effectively under a condition where an area of pixel electrode 21 is the same when increasing the number of the band-like portions 44 and the slits 40 by decreasing both of the band-like portion width 45 and the slit width 41.

The above-mentioned values of the band-like portion width 45 and the slit width 41 are also determined by the above-mentioned calculation formula 1. That is, the ratio of the values of the first pixel electrode 21B, the second pixel electrode 21G, and the third pixel electrode 21R is set to be approximately equal to 8:10:13.

Figure 6:
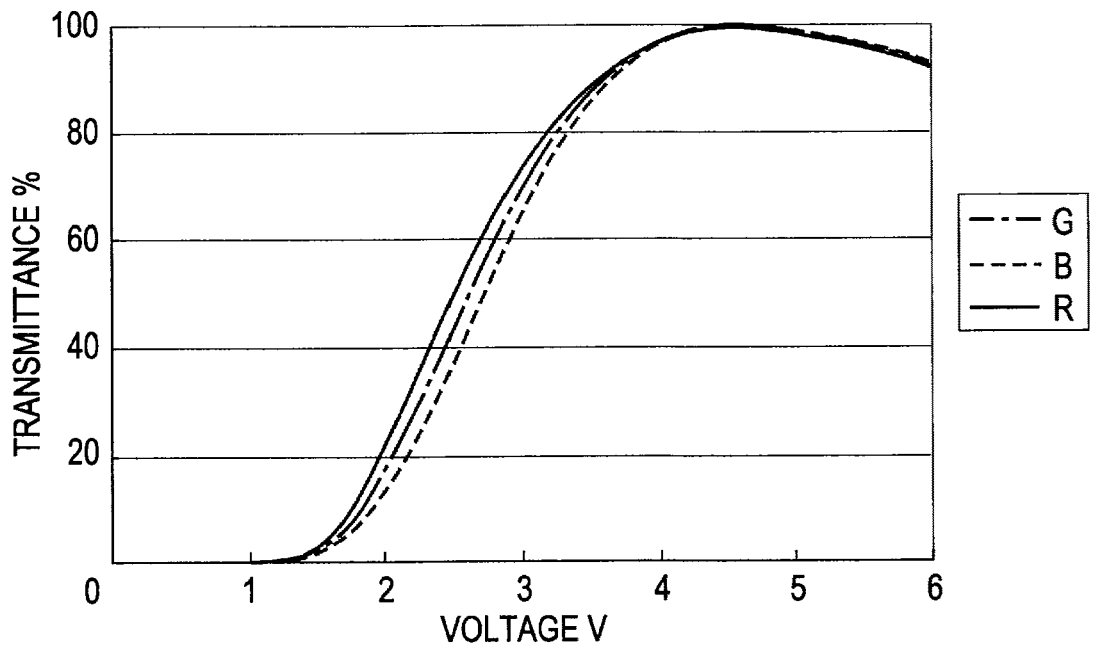
FIG. 6 is a diagram illustrating V-T characteristics of the liquid crystal device according to the first embodiment.

FIG. 6 is a diagram illustrating V-T characteristics of the three type sub-pixels 26 (B, G, and R) in the liquid crystal device 1 according to the embodiment. As shown in the drawing, the V-T characteristics of the three type sub-pixels 26 are substantially the same, and are greatly improved as compared with the V-T characteristics of the known liquid crystal device shown in FIG. 14. Specifically, in the liquid crystal device 1 according to the embodiment, the optimal phase difference (retardation) is given to each sub-pixel 26 by changing the cell thickness 60 in accordance with the peak wavelength of the corresponding color filter 35 in the three type sub-pixels 26. The above-mentioned effect of the orientation regulating force caused by the change (decrease) of the cell thickness 60 is suppressed by decreasing both of the band-like portion width 45 and the slit width 41 formed in the pixel electrode 21, that is, by increasing the pitch of the band-like portion 44. As a result, the V-T characteristics are improved, thereby enabling display in which coloring is suppressed.

Second Embodiment

Figure 7:
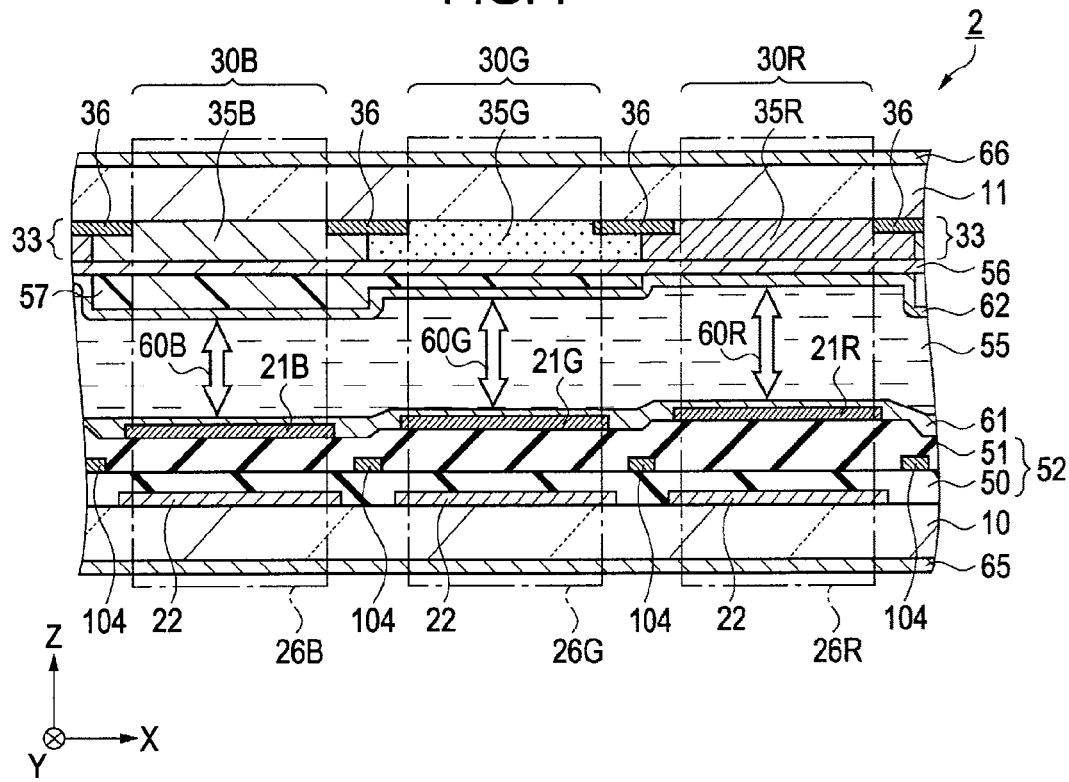
FIG. 7 is a schematic sectional view of a liquid crystal device according to a second embodiment.

Subsequently, a second embodiment of the invention will be described. FIG. 7 is a view schematically illustrating a section of the liquid crystal device 2 according to the second embodiment. FIG. 7 is a sectional view taken along the line which is the same as the section line of the sectional view of the liquid crystal device 1 according to the first embodiment shown in FIG. 5. The liquid crystal device 2 according to the present embodiment has a configuration similar to the liquid crystal device 1 according to the first embodiment. The components formed on the array substrate 10 are substantially the same except for the layer thickness of the interlayer insulation layer 51. The section taken along the line IV-IV of FIG. 3 is also substantially the same except for the existence of a liquid-crystal-thickness adjustment layer 57 to be described later. Therefore, the liquid crystal device 2 according to the embodiment will be described with reference to only FIG. 7 which is a sectional view taken along a section line corresponding to the line V-V of FIG. 3. When components common to the liquid crystal device 1 exist, those components will be referenced by the same reference numerals and signs, and some description thereof will be omitted.

Since the liquid crystal device 2 has a similar configuration to the liquid crystal device 1 as described above, the cell thicknesses 60 of three type sub-pixels 26 (B, G, and R) are set to different values on the basis of the above-mentioned calculation formula 1. Specifically, the cell thickness 60B of the blue sub-pixel 26B is 2.4 μm, and the cell thickness 60G of the green sub-pixel 26G is 3.0 μm, and the cell thickness 60R of the red sub-pixel 26R is 3.9 μm. In the liquid crystal device 2, the phase differences applied to the sub-pixels 26 are more appropriately set by the differences of the cell thicknesses 60 similarly to the liquid crystal device 1, and thus display quality is improved.

The liquid crystal device 2 is different from the liquid crystal device 1 in that the above-mentioned adjustment of the cell thicknesses 60 is not performed on the color filters 35 but is performed on the liquid-crystal-thickness adjustment layer 57. The liquid-crystal-thickness adjustment layer 57 is a layer locally formed between the planarization layer 56 and the second alignment layer 62. The liquid-crystal-thickness adjustment layer 57 is made of transparent-insulating resin such as acryl. The liquid-crystal-thickness adjustment layer 57 is formed in a region including at least the blue sub-pixel region 30B and the green sub-pixel region 30G but excluding the red sub-pixel region 30R in plan view.

In a layer thickness of the liquid-crystal-thickness adjustment layer 57, the layer thickness thereof within the blue sub-pixel region 30B is set larger than the layer thickness thereof within the green sub-pixel region 30G in accordance with the above-mentioned differences of the cell thicknesses 60 of the sub-pixels 26. Furthermore, the layer thicknesses of the color filters 35 of the three type sub-pixels 26 are set to be approximately equal to each other.

In order to suppress the effect of the orientation regulating force caused by the difference of the cell thicknesses 60 of the sub-pixels 26, the liquid crystal device 2 is configured so that the values of the band-like portion width 45 (refer to FIG. 3) and the slit width 41 (refer to FIG. 3) are set to be different for each pixel electrode 21 (B, G, and R) provided in each of the three type sub-pixels 26 (B, G, and R), on the basis of the formula 1 similarly to the liquid crystal device 1.

Specifically, in the first pixel electrode 21B, the band-like portion width 45 is set to 2.4 μm, and the slit width 41 is set to 4.0 μm. In the second pixel electrode 21G, the band-like portion width 45 is set to 3.0 μm, and the slit width 41 is set to 5.0 μm. In the third pixel electrode 21R, the band-like portion width 45 is set to 3.9 μm and the slit width 41 is set to 6.5 μm.

Furthermore, the liquid crystal device 2 is formed differently from the liquid crystal device 1 in that the layer thickness of the dielectric layer 52 is also set to be different for each of the three type sub-pixels 26 (B, G, and R) on the basis of the formula 1. That is, the layer thickness of the dielectric layer 52 within the blue sub-pixel 26B is set to 320 nm, the layer thickness thereof within green sub-pixel 26G is set to 400 nm, and the layer thickness thereof within the red sub-pixel 26R is set to 520 nm.

The dielectric layer 52 is a laminated body between the gate insulation layer 50 and the interlayer insulation layer 51. In the liquid crystal device 2, the layer thickness of the gate insulation layer 50 is common in the sub-pixels 26, and the layer thickness of the interlayer insulation layer 51 is different for each sub-pixel 26. Specifically, the layer thickness of the interlayer insulation layer 51 within a region, which overlaps with the pixel electrode 21 in plan view, of the blue sub-pixel 26B is set smaller by 80 nm than the layer thickness within the region of the green sub-pixel 26G. In addition, the layer thickness thereof within the region, which overlaps with the pixel electrode 21 in plan view, of the red sub-pixel 26R is set larger by 120 nm than the layer thickness within the region of the green sub-pixel 26G.

Here, the electric field between the pixel electrode 21 and the common electrode 22 is generated through the dielectric layer 52. Accordingly, the intensity of the electric field becomes higher as the layer thickness of the dielectric layer 52 becomes smaller, and thus the rotational force to the liquid crystal molecules increases. The thickness of the dielectric layer 52 may be set to be small as the cell thickness 60 is set to be small. In such a manner, the above-mentioned effect of the orientation regulating force caused by an increase in ratio of the liquid crystal molecules near the interface between the pair of alignment layers and the liquid crystal layer is suppressed. As a result, it is possible to suppress deterioration in transmittance (when the same voltage is applied). Specifically, in the liquid crystal device 2, difference of the sub-pixels 26 occurs in the electric field intensity itself in addition to the effect of the change of the band-like portion width 45 and the like. In such a manner, deterioration in transmittance caused by the difference of the cell thickness 60 is more appropriately suppressed, thereby obtaining more improved display quality.

Figure 8:
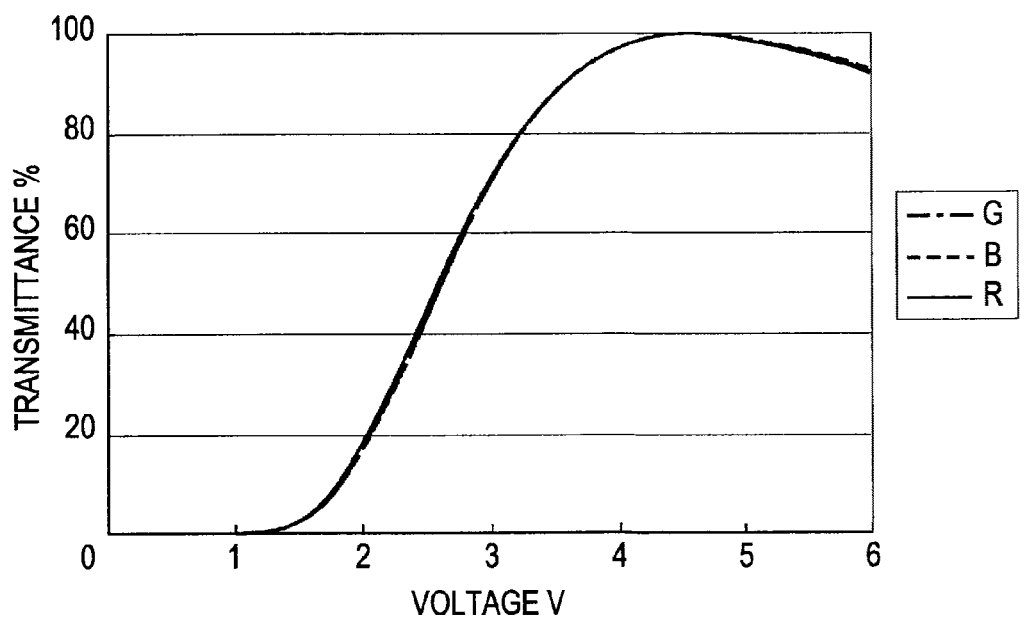
FIG. 8 is a diagram illustrating V-T characteristics of the liquid crystal device according to the second embodiment.

FIG. 8 is a diagram illustrating V-T characteristics of the three type sub-pixels 26 (B, G, and R) provided in the liquid crystal device 2. As shown in the drawing, the V-T characteristics of the three type sub-pixels 26 are substantially the same, and are greatly improved compared with the V-T characteristics of the known liquid crystal device shown in FIG. 14. In addition, even compared with the V-T characteristic of the liquid crystal device 1 according to the first embodiment shown in FIG. 6, the V-T characteristics are slightly improved by providing difference in layer thickness of the dielectric layer 52 among the sub-pixels 26. Accordingly, display in which coloring is greatly suppressed is enabled, compared with the known liquid crystal device. Further, in the liquid crystal device 2, the adjustment of the cell thickness 60 is performed by the liquid-crystal-thickness adjustment layer 57 formed separately from the color filters 35. Hence, the layer thickness of the color filter 35 is determined centering on display quality. As a result, this configuration also contributes to an improvement in display quality compared with the liquid crystal device 1.

Third Embodiment

Figure 9:
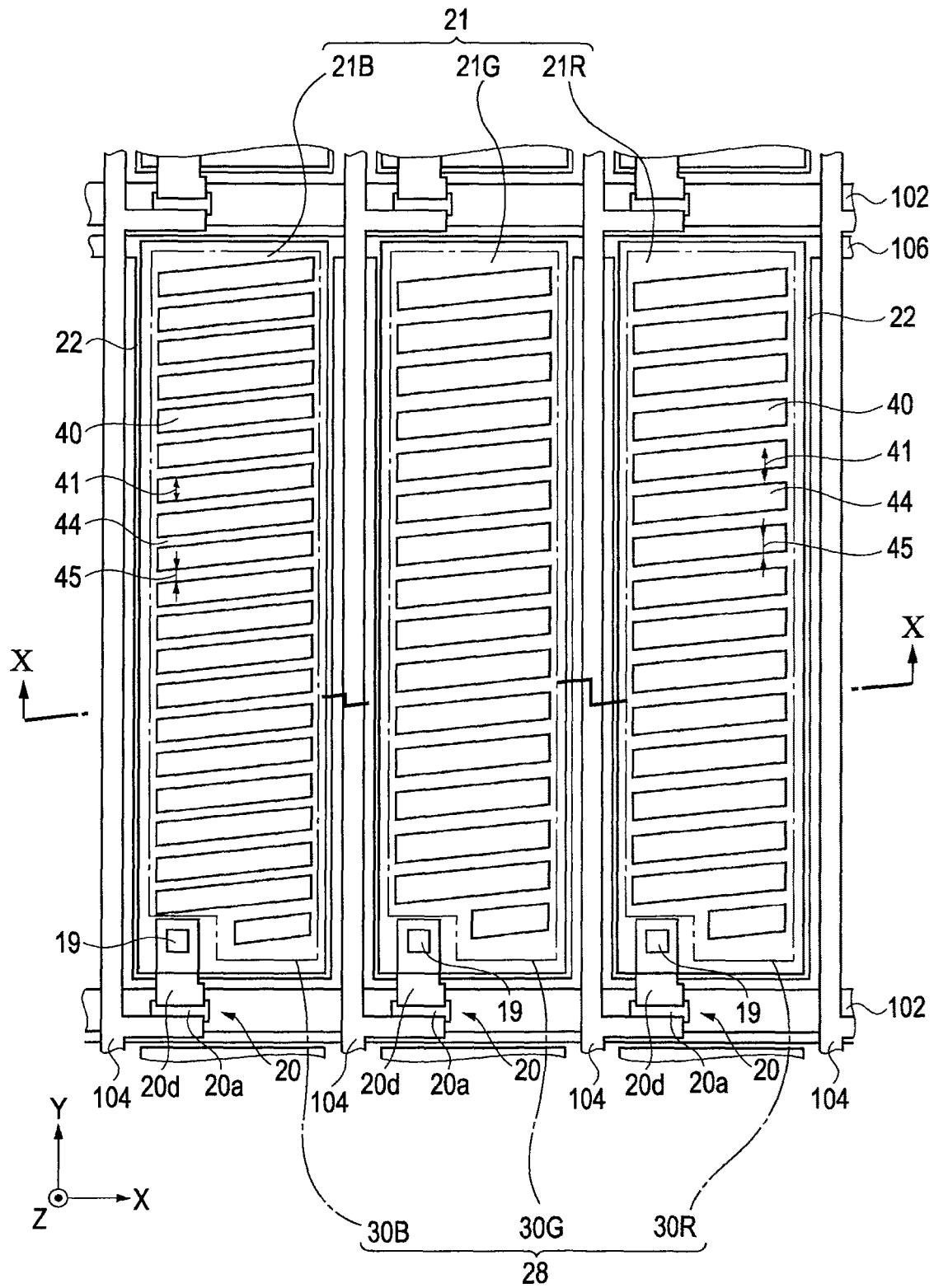
FIG. 9 is a schematic top plan view of a liquid crystal device according to a third embodiment.

Subsequently, a third embodiment of the invention will be described. FIG. 9 is a view schematically illustrating a planar configuration of the pixel region 28 of the liquid crystal device 3 according to the third embodiment, where the pixel region 28 includes the blue sub-pixel region 30B, the green sub-pixel region 30G, and the red sub-pixel region 30R. In addition, FIG. 9 corresponds to FIG. 3 in the above-mentioned first embodiment, and is a view of the array substrate 10 (refer to FIG. 10) viewed from the normal direction. Accordingly, the color filters 35 and the like formed on the counter substrate 11 (refer to FIG. 10) are not shown.

Figure 10:
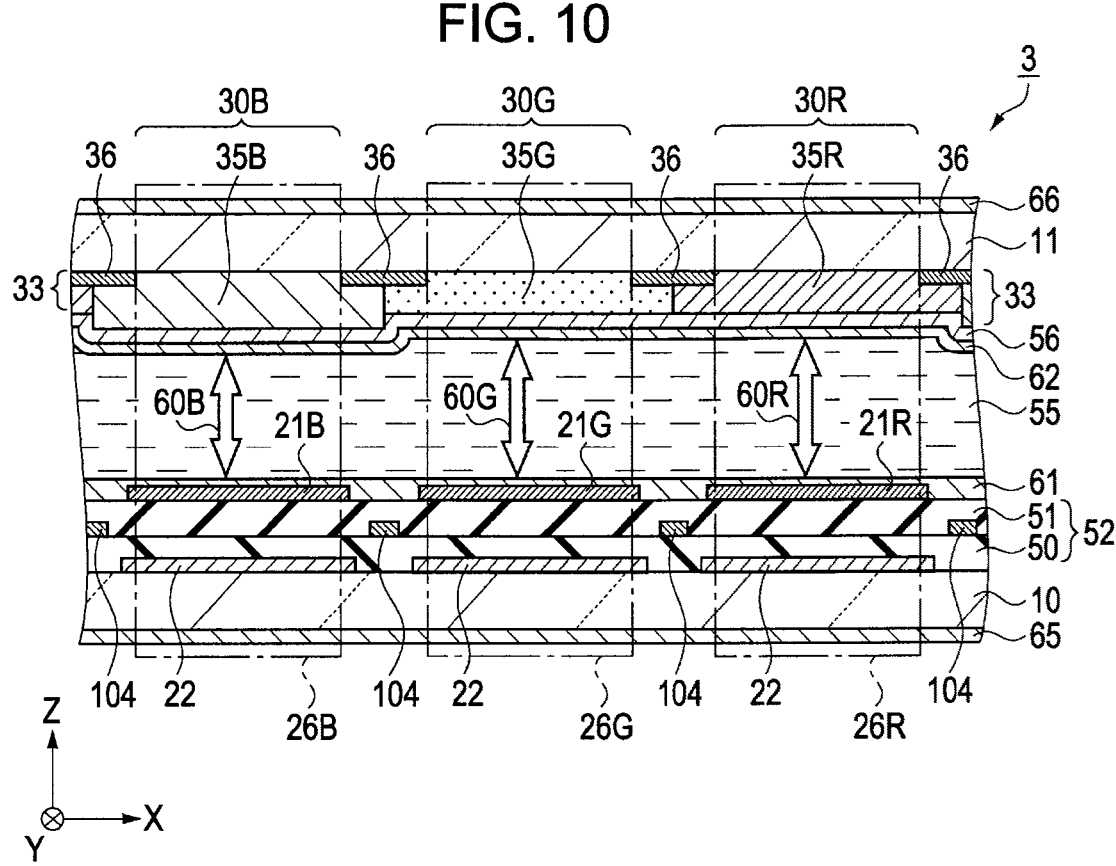
FIG. 10 is a schematic sectional view of the liquid crystal device according to the third embodiment.

FIG. 10 is a sectional view taken along the line X-X shown in FIG. 9, and is a view corresponding to the sectional view of the liquid crystal device 1 according to the first embodiment shown in FIG. 5 and to the sectional view of the liquid crystal device 2 according to the second embodiment shown in FIG. 7.

In both drawings, when components common to the liquid crystal device 1 according to the first embodiment exist, those components will be referenced by the same reference numerals and signs. In addition, some description of the components will be omitted. The liquid crystal device 3 according to the present embodiment is different from the liquid crystal devices 1 and 2 in that the cell thicknesses 60 of only the blue sub-pixel 26B and the green sub-pixel 26G are set on the basis of the above mentioned formula 1. In addition, the band-like portion width 45 and the slit width 41 of each pixel electrode 21 are set on the basis of the formula 1 in order to suppress the effect of the orientation regulating force caused by the difference of the cell thicknesses 60. As a result, in the second pixel electrode 21G provided in the green sub-pixel 26G and the third pixel electrode 21R provided in the red sub-pixel 26R, the cell thicknesses 60 are the same, the band-like portion widths 45 are the same, and the slit widths 41 are the same.

Specifically, the cell thickness 60B of the blue sub-pixel 26B is 2.4 µm, the cell thickness 60G of the green sub-pixel 26G is 3.0 µm, and the cell thickness 60R of the red sub-pixel 26R is 3.0 µm. In addition, in the first pixel electrode 21B, the band-like portion width 45 is 2.4 µm, and the slit width 41 is 4.0 µm. In the second pixel electrode 21G, the band-like portion width 45 is 3.0 µm, and the slit width 41 is 5.0 µm. In the third pixel electrode 21R, the band-like portion width 45 is 3.0 µm and the slit width 41 is 5.0 µm. Furthermore, the above-mentioned difference of the cell thicknesses 60 is made by making the layer thickness of the color filter 35 different for each sub-pixel 26, similarly to the liquid crystal device 1.

In the liquid crystal device 3 according to the embodiment, the difference is in the dimensions of components of the blue sub-pixel 26B and the green sub-pixel 26G. The reason is that, in the known liquid crystal device in which components of the sub-pixels 26 have common sizes, the difference of the V-T characteristics of the blue sub-pixel 26B and the green sub-pixel 26G is larger than that of the green sub-pixel 26G and the red sub-pixel 26R.

Figure 14:
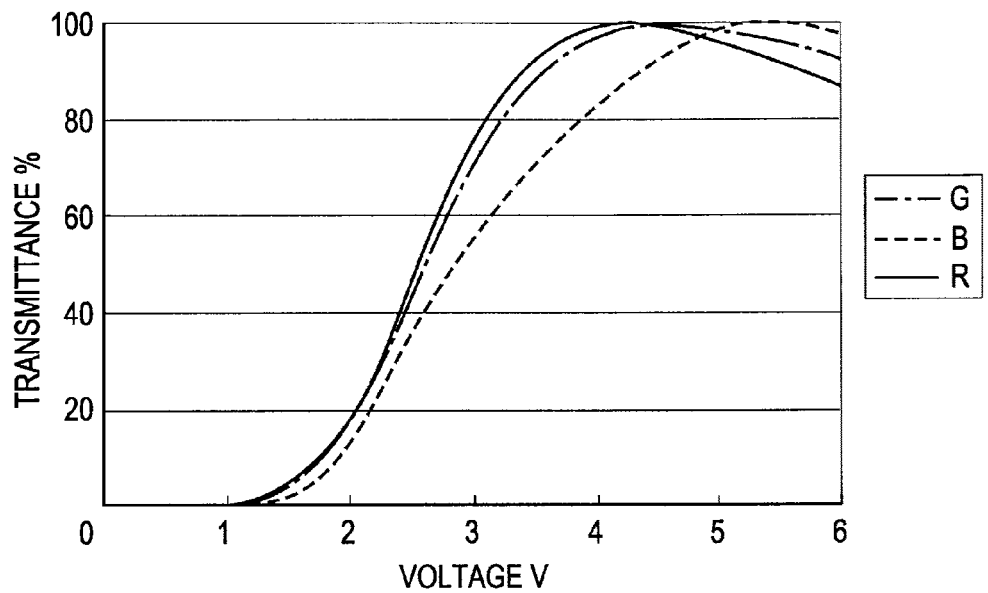
FIG. 14 is a V-T curve of the known liquid crystal device.

In the known liquid crystal device shown in FIG. 14, the difference of the V-T characteristics of the green sub-pixel 26G and the red sub-pixel 26R is small, and voltages of those at the maximum transmittance are substantially the same. In contrast, the difference of the V-T characteristics of the blue sub-pixel 26B and the green sub-pixel 26G is large, and the voltages of those at the maximum transmittance are different from each other by about 1 V (Volt). As a result, it can be expected that display quality will be improved by improving the above mentioned V-T characteristics of the blue sub-pixel 26B and the green sub-pixel 26G.

Figure 11:
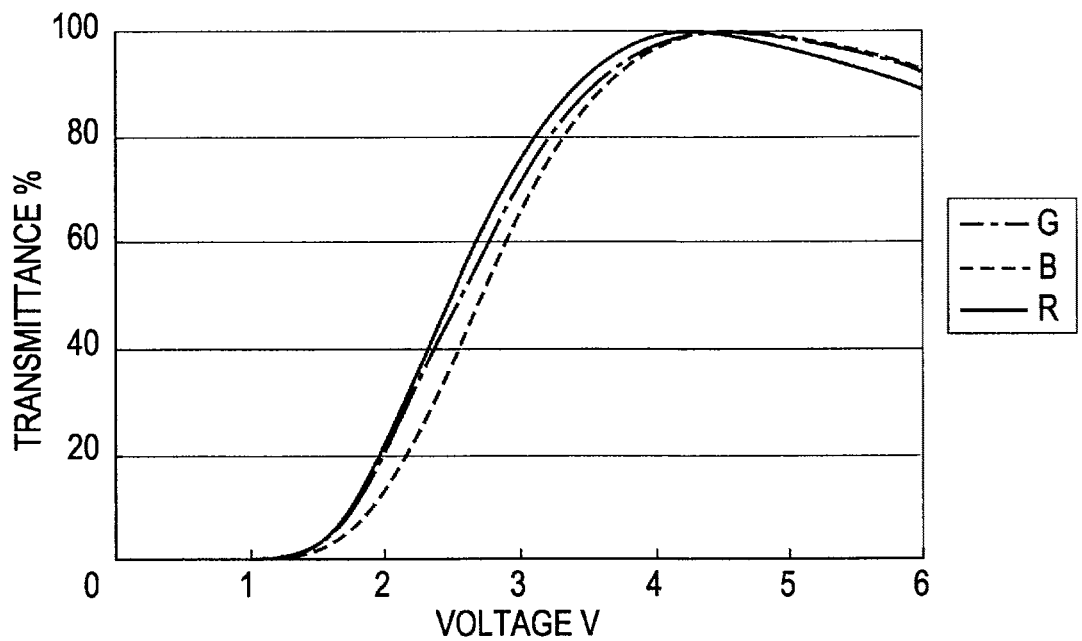
FIG. 11 is a diagram illustrating V-T characteristics of the liquid crystal device according to the third embodiment.

FIG. 11 is a diagram illustrating V-T characteristics of the three type sub-pixels 26 (B, G, and R) provided in the liquid crystal device 3. As shown in the drawings, the V-T characteristics of the blue sub-pixel 26B and the green sub-pixel 26G are greatly improved to substantially coincide with each other. In addition, the V-T characteristics approach the V-T characteristics of the liquid crystal device 2 according to the second embodiment shown in FIG. 8.

On the other hand, in the liquid crystal device 3 according to the embodiment, an increase in manufacturing cost is suppressed compared with the above mentioned liquid crystal devices 1 and 2. That is, since the layer thicknesses of the color filters 35 are two steps, the efficiency of the process of forming the color filter layer 33 is improved. As a result, in the liquid crystal device 3 according to the embodiment, the increase in manufacturing cost is suppressed, and coloring caused by the difference of the V-T characteristics is suppressed, thereby enabling high-quality display compared with the known liquid crystal device.

Fourth Embodiment

Figure 12:
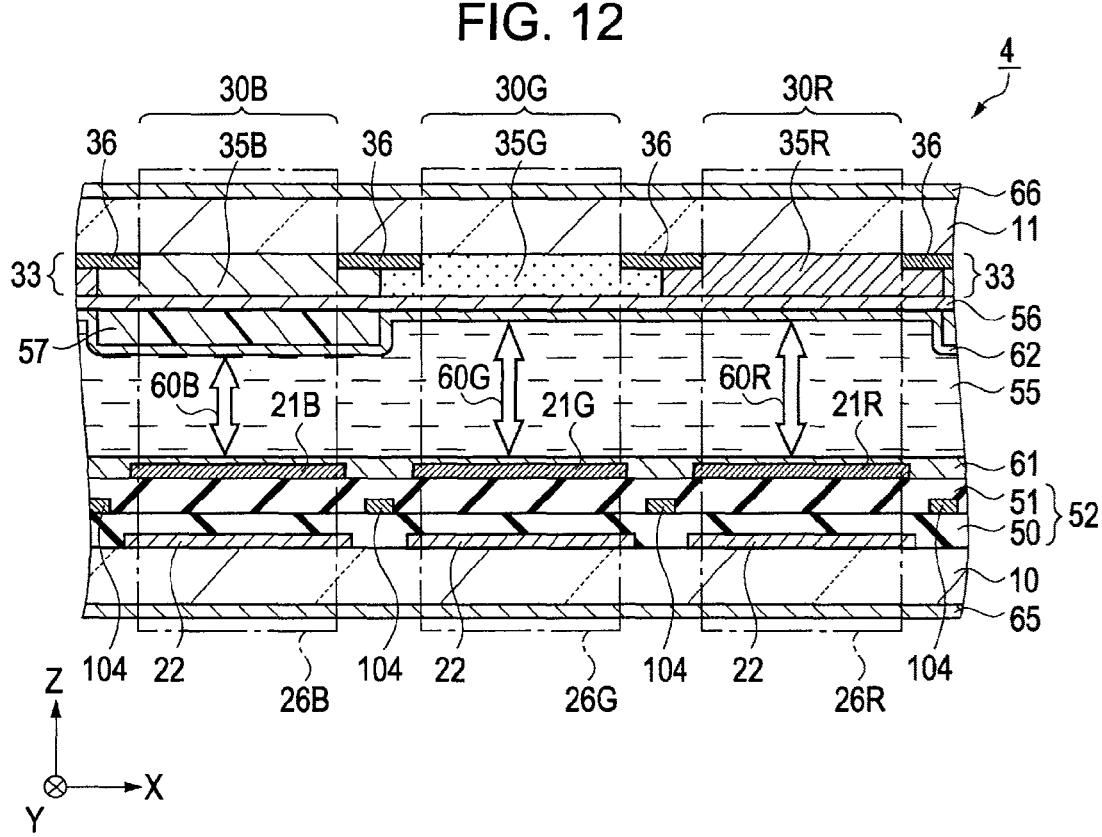
FIG. 12 is a schematic sectional view of a liquid crystal device according to a fourth embodiment.

Subsequently, a fourth embodiment of the invention will be described. FIG. 12 is a view schematically illustrating a section of the liquid crystal device 4 according to the fourth embodiment. FIG. 12 is a sectional view taken along the line which is the same as the section line of the sectional view of the liquid crystal device 1 according to the first embodiment shown in FIG. 5. In FIG. 12, when components common to the liquid crystal devices 1 to 3 according to the first to third embodiments exist, those components will be referenced by the same reference numerals and signs. In addition, some description of the components will be omitted.

The liquid crystal device 4 according to the embodiment is similar to both of the liquid crystal devices 2 and 3 according to the second and third embodiments. Specifically, the cell thickness 60B of the blue sub-pixel 26B is 2.4 µm, and the cell thicknesses (60G and 60R) of the other two type sub-pixels 26 (26G and 26R) are 3.0 µm. In addition, the adjustment of the cell thickness 60 is performed by the liquid-crystal-thickness adjustment layer 57.

In addition, in the first pixel electrode 21B provided in the blue sub-pixel 26B, the band-like portion width 45 is 2.4 µm, and the slit width 41 is 4.0 µm. In the other pixel electrodes 21 provided in the other two type sub-pixels 26, the band-like portion width 45 is 3.0 µm, and the slit width 41 is 5.0 µm.

The fourth embodiment is similar to the above-mentioned embodiments in that the difference in dimensions of the blue sub-pixel 26B and the two type sub-pixels 26 of the green sub-pixel 26G and the red sub-pixel 26R is set on the basis of the above-mentioned formula 1. The reason for providing the difference between the blue sub-pixel 26B and the other two type sub-pixels 26 is similar to the third embodiment.

Figure 13:
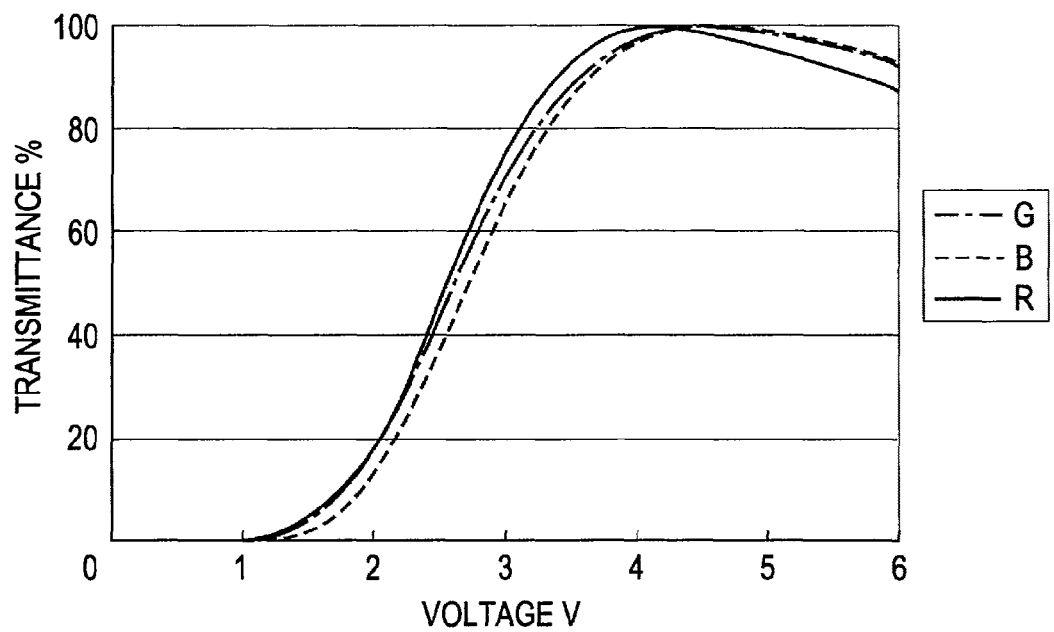
FIG. 13 is a diagram illustrating V-T characteristics of the liquid crystal device according to the fourth embodiment.

FIG. 13 is a diagram illustrating V-T characteristics of the three type sub-pixels 26 (B, G, and R) provided in the liquid crystal device 4. Similarly to the result of the liquid crystal device 3 according to the third embodiment as shown in FIG. 11, the V-T characteristics of the blue sub-pixel 26B and the green sub-pixel 26G are greatly improved to substantially coincide with each other. In addition, the V-T characteristics approach the V-T characteristics of the liquid crystal device 2 according to the second embodiment shown in FIG. 8.

In the liquid crystal device 4 according to the embodiment, the adjustment of the cell thickness 60 is performed by the liquid-crystal-thickness adjustment layer 57 formed separately from the color filters 35, similarly to the liquid crystal device 2 according to the second embodiment. Accordingly, the layer thickness of the color filter 35 is determined centering on display quality. This configuration contributes to improvement in display quality compared with the liquid crystal device 3. As a result, in the liquid crystal device 4 according to the embodiment, the increase in manufacturing cost is suppressed, and coloring caused by the difference of the V-T characteristics is suppressed, thereby enabling high-quality display compared with the known liquid crystal device. Furthermore, since the layer thicknesses of the color filters 35 have one value, the efficiency of the process of forming the color filter layer 33 is improved, similarly to the liquid crystal device 2 according to the second embodiment.

Electronic Apparatus

Figure 15:
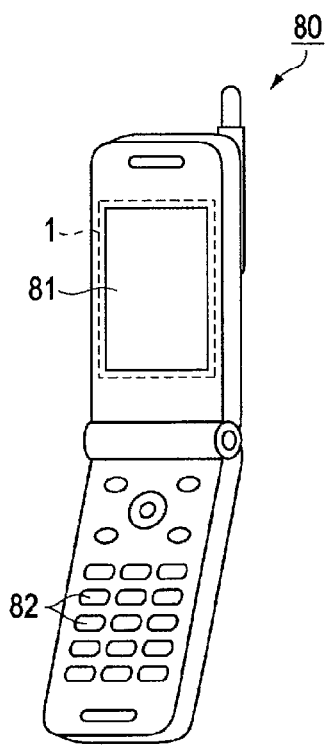
FIG. 15 is a perspective view of a mobile phone as an electronic apparatus.

Next, an example of applying any one of the liquid crystal devices according to the first to fourth embodiments to an electronic apparatus will be described. FIG. 15 is a perspective view of a mobile phone 80 as an electronic apparatus. The mobile phone 80 has a display section 81 and an operating button 82. The display section 81 is able to display various information such as contents input by the operating button 82 and incoming information by use of the liquid crystal device 1 (or any one of the liquid crystal devices 2 to 4) built therein.

In the mobile phone 80, the display section 81 includes the liquid crystal device 1 (or any one of the liquid crystal devices 2 to 4) capable of displaying a high-quality image in which coloring is small with a wide viewing angle. Accordingly, it is possible to transfer a lot of information to an observer.

Furthermore, the liquid crystal device 1 (or any one of the liquid crystal devices 2 to 4) is applicable to not only the mobile phone 80 but also various electronic apparatuses such as a mobile computer, a digital camera, a digital video camera, an on-vehicle apparatus, and an audio apparatus.

Modified Example

Figure 16:
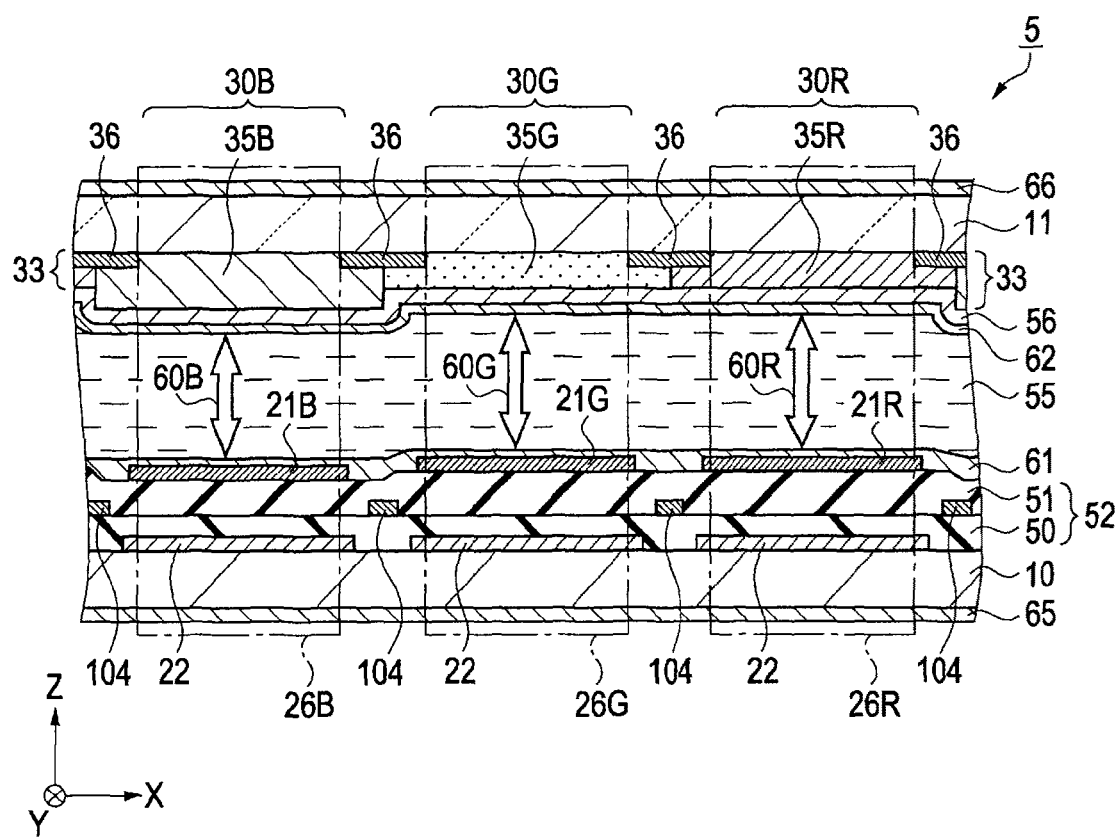
FIG. 16 is a schematic sectional view of a liquid crystal device according to a modified example.

FIG. 16 is a view illustrating a liquid crystal device according to a modified example. In FIG. 16, when components common to the liquid crystal devices 1 to 4 according to the first to fourth embodiments exist, those components will be referenced by the same reference numerals and signs. In addition, some description thereof will be omitted. In addition, the planar shape of the liquid crystal device according to the modified example is substantially the same as the planar shape of the liquid crystal device 3 according to the third embodiment shown in FIG. 9.

The liquid crystal device 5 according to the modified example is similar to both the liquid crystal devices 3 and 4 according to the third and fourth embodiments in that the cell thickness 60B of the blue sub-pixel 26B is 2.4 µm, and the cell thicknesses (60G and 60R) of the other two type sub-pixels 26 (26G and 26R) are 3.0 µm. In addition, the layer thickness of the dielectric layer 52 is different for each sub-pixel 26, similarly to the liquid crystal device 2 according to the second embodiment. In the liquid crystal device 5 according to the modified example, the layer thickness of the dielectric layer of the blue sub-pixel 26B is different from the other two type sub-pixels 26.

As shown in the drawing, the interlayer insulation layer 51 is formed to have a small layer thickness in a region including the blue sub-pixel region 30B but excluding the other two type sub-pixel regions, thereby suppressing the effect of the orientation regulating force caused by the decrease of the cell thickness 60B. The difference of the layer thicknesses in the dielectric layer 52 is made by changing the layer thickness of the interlayer insulation layer 51 similarly to the liquid crystal device 2 according to the second embodiment. As a result, similarly to the liquid crystal devices according to the above-mentioned embodiments, coloring caused by the difference of the V-T characteristics is suppressed, thereby enabling high-quality display compared with the known liquid crystal device.

The entire disclosure of Japanese Patent application No. 2008-234379, field Sep. 12, 2008 is expressly incorporated by reference herein.

What is claimed is:

1. A liquid crystal device comprising:
   a pair of substrates which are formed of a first substrate and a second substrate disposed to face each other;
   a liquid crystal layer which is sandwiched between the pair of substrates;

a color filter layer which is formed on the second substrate and has at least a first coloration layer for transmitting light of a first wavelength region and a second coloration layer for transmitting light of a second wavelength region on a longer wavelength side than the first wavelength region;

first electrodes each of which is formed on the first substrate and has at least a first pixel electrode disposed on a first sub-pixel region corresponding to a planar region of the first coloration layer and a second pixel electrode disposed on a second sub-pixel region corresponding to a planar region of the second coloration layer; and second electrodes each of which faces each first electrode with a dielectric layer interposed therebetween, wherein any one electrode of each first electrode and each second electrode has a plurality of band-like portions which are arranged at predetermined intervals in parallel to each other in the first and second sub-pixel regions, wherein a layer thickness of the liquid crystal layer within the first sub-pixel region is smaller than a layer thickness of the liquid crystal layer within the second sub-pixel region, wherein a width of each band-like portion within the first sub-pixel region is smaller than a width of each band-like portion within the second sub-pixel region, wherein the predetermined intervals within the first sub-pixel region are smaller than the predetermined intervals within the second sub-pixel region, and wherein a layer thickness of the dielectric layer within the first sub-pixel region is smaller than a layer thickness of the dielectric layer within the second sub-pixel region.

2. The liquid crystal device according to claim 1, wherein values of at least one item of the total four items of a layer thickness of the liquid crystal layer, a width of the band-like portion, the predetermined intervals, and a layer thickness of the dielectric layer satisfy a relationship of approximate equivalence between a ratio of the value of the item within the first sub-pixel region to the value of the item within the second sub-pixel region and a ratio of $\lambda_1 \cdot \Delta n(\lambda_2)$ to $\lambda_2 \cdot \Delta n(\lambda_1)$, where $\lambda_1$ is a peak wavelength of the first wavelength region, $\lambda_2$ is a peak wavelength of the second wavelength region, $\Delta n(\lambda_2)$ is a refractive index anisotropy of the liquid crystal layer at the peak wavelength $\lambda_2$, and $\Delta n(\lambda_1)$ is a refractive index anisotropy of the liquid crystal layer at the peak wavelength $\lambda_1$.

3. The liquid crystal device according to claim 2, wherein a layer thickness of the first coloration layer is larger than a layer thickness of the second coloration layer, wherein at least a part of a difference between the layer thickness of the liquid crystal layer within the first sub-pixel region and the layer thickness of the liquid crystal layer within the second sub-pixel region is formed by a difference between the layer thickness of the first coloration layer and the layer thickness of the second coloration layer.

4. The liquid crystal device according to claim 2, wherein a liquid-crystal-thickness adjustment layer is formed in the first sub-pixel region on a side of the second substrate facing the liquid crystal layer, wherein at least a part of a difference between the layer thickness of the liquid crystal layer within the first sub-pixel region and the layer thickness of the liquid crystal layer within the second sub-pixel region is formed by the liquid-crystal-thickness adjustment layer.

5. The liquid crystal device according to claim 2, wherein a first liquid-crystal-thickness adjustment layer is formed in the first sub-pixel region on a side of the second substrate facing the liquid crystal layer, wherein a second liquid-crystal-thickness adjustment layer is formed in the second sub-pixel region on the side of the second substrate facing the liquid crystal layer so as to be thinner than the first liquid-crystal-thickness adjustment layer, and wherein at least a part of a difference between the layer thickness of the liquid crystal layer within the first sub-pixel region and the layer thickness of the liquid crystal layer within the second sub-pixel region is formed by a difference between the first liquid-crystal-thickness adjustment layer and the second liquid-crystal-thickness adjustment layer.

6. The liquid crystal device according to claim 2, further comprising:

a third coloration layer which transmits light of a wavelength region corresponding to red light; and a third sub-pixel region which corresponds to a planar region of the third coloration layer, wherein the first wavelength region is a wavelength region corresponding to blue light, and wherein the second wavelength region is a wavelength region corresponding to green light.

7. The liquid crystal device according to claim 6, wherein values of at least one item of the total four items of the layer thickness of the liquid crystal layer, the width of the band-like portion, the predetermined intervals, and the layer thickness of the dielectric layer satisfy a relationship of approximate equivalence between a ratio of the value of the item within the second sub-pixel region to the value of the item within the third sub-pixel region and a ratio of $\lambda_2 \cdot \Delta n(\lambda_3)$ to $\lambda_3 \cdot \Delta n(\lambda_2)$, where $\lambda_3$ is a peak wavelength of the wavelength region corresponding to the red light, and $\Delta n(\lambda_3)$ is a refractive index anisotropy of the liquid crystal layer at the peak wavelength $\lambda_3$.

8. The liquid crystal device according to claim 7, wherein a layer thickness of the second coloration layer is larger than a layer thickness of the third coloration layer, wherein at least a part of a difference between the layer thickness of the liquid crystal layer within the second sub-pixel region and the layer thickness of the liquid crystal layer within the third sub-pixel region is formed by a difference between the layer thickness of the second coloration layer and the layer thickness of the third coloration layer.

9. The liquid crystal device according to claim 7, wherein a liquid-crystal-thickness adjustment layer is formed in the second sub-pixel region on a side of the second substrate facing the liquid crystal layer, wherein at least a part of a difference between the layer thickness of the liquid crystal layer within the second sub-pixel region and the layer thickness of the liquid crystal layer within the third sub-pixel region is formed by the liquid-crystal-thickness adjustment layer.

10. An electronic apparatus comprising a display section which is provided with the liquid crystal device according to claim 1.

* * * * *